US009111205B2

(12) United States Patent
Tsuwano et al.

(10) Patent No.: US 9,111,205 B2
(45) Date of Patent: Aug. 18, 2015

(54) INFORMATION PROCESSING DEVICE, METHOD, AND PROGRAM PRODUCT GENERATING A THIRD OBJECT HAVING HIGHER DISPLAY PRIORITY THAN A SAME SHAPED FIRST OBJECT AND LOWER DISPLAY PRIORITY THAN A SECOND OBJECT

(71) Applicants: Fumiko Tsuwano, Tokyo (JP); Masahide Horiuchi, Tokyo (JP); Youhei Yamane, Tokyo (JP); Hiroki Yamamoto, Tokyo (JP)

(72) Inventors: Fumiko Tsuwano, Tokyo (JP); Masahide Horiuchi, Tokyo (JP); Youhei Yamane, Tokyo (JP); Hiroki Yamamoto, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/536,993

(22) Filed: Nov. 10, 2014

(65) Prior Publication Data

US 2015/0131113 A1    May 14, 2015

(30) Foreign Application Priority Data

Nov. 12, 2013    (JP) ................................ 2013-234418

(51) Int. Cl.
*G06K 15/00* (2006.01)
*G06K 15/02* (2006.01)
*G06K 15/14* (2006.01)

(52) U.S. Cl.
CPC .......... *G06K 15/1885* (2013.01); *G06K 15/002* (2013.01); *G06K 15/14* (2013.01); *G06K 15/1878* (2013.01); *G06K 15/1889* (2013.01)

(58) Field of Classification Search
None
See application file for complete search history.

(56) References Cited

U.S. PATENT DOCUMENTS

2013/0222817 A1    8/2013    Suzuki et al.
2014/0153057 A1*   6/2014    Yaginuma et al. ........... 358/3.26

FOREIGN PATENT DOCUMENTS

| JP | 2554631 | 8/1996 |
| JP | 2013-015876 | 1/2013 |
| JP | 2013-182027 | 9/2013 |

* cited by examiner

*Primary Examiner* — Scott A Rogers
(74) *Attorney, Agent, or Firm* — Oblon, McClelland, Maier & Neustadt, L.L.P.

(57) ABSTRACT

An information processing device includes a receiving unit, a first identifying unit, and a generation unit. The receiving unit receives specified position information indicating a position specified by a user with respect to an image indicated by target image data including drawing information of each object. The first identifying unit identifies a first object indicating an object including the position indicated by the specified position information. The generation unit generates a third object indicating an object having lower priority of display than a second object indicating higher priority of display than the first object, and having higher priority of display than the first object, and an object having the same shape as the first object.

8 Claims, 12 Drawing Sheets

| TYPE OF GLOSS EFFECT | GLOSS | DEVIATION |
|---|---|---|
| SPECULAR GLOSS (PG) | Gs≥80 | ΔGs≤10 |
| SOLID GLOSS (G) | Gs=Gs (SOLID GLOSS) | ΔGs≤10 |
| HALFTONE-DOT MATT (M) | Gs=Gs (1C 30% HALFTONE-DOT) | ΔGs≤10 |
| MATTING (PM) | Gs≤10 | ΔGs≤10 |

FIG.4

IMAGE DATA FOR GLOSS CONTROL PLATE

▨ :AREA TO WHICH PG IS SPECIFIED (DENSITY VALUE 98%)

▧ :AREA TO WHICH G IS SPECIFIED (DENSITY VALUE 90%)

▤ :AREA TO WHICH M IS SPECIFIED (DENSITY VALUE 16%)

INFORMATION PROCESSING DEVICE, METHOD, AND PROGRAM PRODUCT GENERATING A THIRD OBJECT HAVING HIGHER DISPLAY PRIORITY THAN A SAME SHAPED FIRST OBJECT AND LOWER DISPLAY PRIORITY THAN A SECOND OBJECT

CROSS-REFERENCE TO RELATED APPLICATIONS

The present application claims priority to and incorporates by reference the entire contents of Japanese Patent Application No. 2013-234418 filed in Japan on Nov. 12, 2013.

BACKGROUND OF THE INVENTION

1. Field of the Invention

The present invention relates to an information processing device, a method of processing information, and a computer-readable recording medium.

2. Description of the Related Art

In recent years, technologies of performing printing with a special color ink such as a clear toner have been increasing. In the printing with a special color ink, an object (hereinafter, a special color object) to be printed with the special color ink is arranged on an existing object of an original copy. This enables the printing with the special color ink.

Here, for example, when a part of a first object overlaps with a second object having higher priority of display than the first object, to add another object (for example, a special color object) only to a portion of the first object, the portion not overlapping with the second object, work for specifying extraction of a contour according to the shape of the portion (for example, work of specifying a processing range of contour extraction processing), or the like is required.

Further, for example, JP 2554631 B discloses a configuration of causing the priority of display of an object to be selected, of overlapping objects, to be highest.

However, with the configuration disclosed in JP 2554631 B, another object cannot be added without hiding a front object. Therefore, another object cannot be added only to a portion of the first object, the portion not overlapping with the second object having higher priority of display than the first object.

There is a need for an information processing device, a method of processing information, and a computer-readable recording medium capable of improving work efficiency of a user when another object is added only to a portion of the first object, the portion not overlapping with the second object having higher priority of display than the first object.

SUMMARY OF THE INVENTION

It is an object of the present invention to at least partially solve the problems in the conventional technology.

The present invention provides an information processing device that includes a receiving unit configured to receive specified position information indicating a position specified by a user with respect to an image indicated by target image data including drawing information of each object; a first identifying unit configured to identify a first object indicating an object including the position indicated by the specified position information; and a generation unit configured to generate a third object indicating an object having lower priority of display than a second object indicating an object having higher priority of display than the first object, and having higher priority of display than the first object, and an object having a same shape as the first object.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an information processing device, a method of processing information, and a computer-readable recording medium according to the present invention will be described in detail with reference to the appended drawings.

First, a configuration of an image forming system of the present embodiment will be described with reference to FIG. 1.

Figure 1:
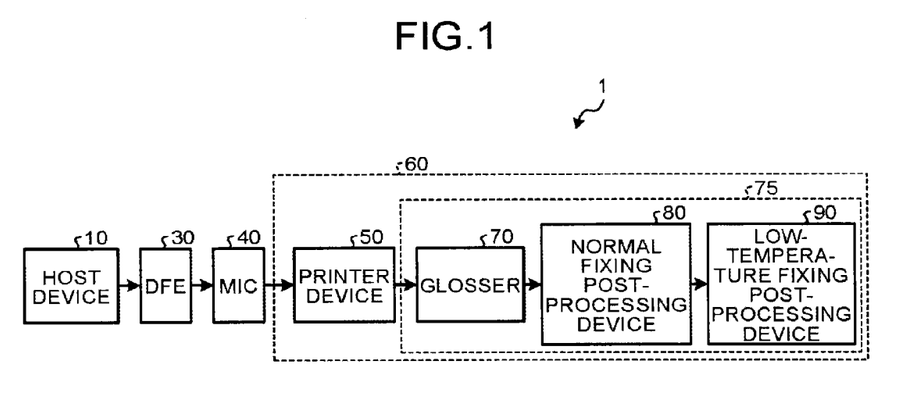
FIG. 1 is a diagram illustrating an example of a configuration of an image forming system.

As illustrated in FIG. 1, an image forming system 1 of the present embodiment includes a host device 10, a printer control device. (digital front end) (hereinafter, referred to as DFE) 30, an interface controller (mechanism I/F controller) (hereinafter, may be referred to as MIC) 40, and a printing device 60. The host device 10, the DFE 30, the MIC 40, and the printing device 60 are mutually connected through a wired or wireless communication line in a data-transferable manner.

The DFE 30 performs communication with the printing device 60 through the MIC 40, and controls formation of an image in the printing device 60. Further, the host device 10 such as a personal computer (PC) is connected to the DFE 30. The DFE 30 receives image data from the host device 10. The DFE 30 then generates, using the image data, image data for the printing device 60 to form a toner image according to CMYK toners and a clear toner. Further, the DFE 30 transmits the generated image data to the printing device 60 through the MIC 40.

In the example of FIG. 1, the printing device 60 is configured from a printer device 50 and a post-processing device 75. In the printer device 50, the CMYK toners and the clear toner are at least mounted, and an image formation unit including a photoconductor, a charging device, a developing device, and a photoconductor cleaner, and an exposure device are mounted for each toner. The printer device 50 emits a light beam from the exposure device to form a toner image on the photoconductor according to the respective toners, and transfers the toner image on a recording medium such as a recording paper, according to the image data transmitted from the DFE 30 through the MIC 40. The transferred toner image is applied heat and pressure at a temperature within a predetermined range (normal temperature) in a fixing device (not illustrated) and fixed on the recording medium. Accordingly, an image is formed on the recording medium.

Here, the clear toner is a transparent (colorless) toner not including a color material. Note that transparent (colorless) indicates that the transmittance is 70% or more.

In the example of FIG. 1, the post-processing device 75 is configured from a glosser 70 connected to the printer device 50, a normal fixing post-processing device 80 connected to the glosses 70, and a low-temperature fixing post-processing device 90 connected to the normal fixing post-processing device 80. However, the post-processing device 75 is not limited thereto, and can employ various known configurations. ON and OFF of the glosses 70 are controlled by the DFE 30, and when the glosser 70 is turned ON, the glosser 70 re-fixes the image formed on the recording medium by the printer device 50. Accordingly, a total adhesion amount of toners of pixels to which a predetermined amount or more of the toners adheres becomes uniformly compressed in the entire image formed on the recording medium.

The clear toner and the fixing device for fixing the clear toner are mounted on the normal fixing post-processing device 80, and image data for clear toner plate (image data for forming a toner image according to the clear toner) generated by the DFE 30 is input to the normal fixing post-processing device 80. The normal fixing post-processing device 80 superimposes the toner image by the clear toner on the image pressurized by the glosser 70 and formed on the recording medium, using the input image data for clear toner plate. The toner image formed on the recording medium is then applied heat and pressure at a normal temperature in the fixing device and fixed on the recording medium.

The clear toner and the fixing device for fixing the clear toner are mounted on the low-temperature fixing post-processing device 90, and image data for clear toner plate generated by the DFE 30 is input to the low-temperature fixing post-processing device 90. The low-temperature fixing post-processing device 90 superimposes the toner image by the clear toner on the image pressurized by the glosser 70 and the normal fixing post-processing device 80 and formed on the recording medium, using the input image data for clear toner plate. The toner image formed on the recording medium is then applied heat and pressure at a lower temperature (low temperature) than the normal temperature in the fixing device and fixed on the recording medium.

Here, the image data output from the host device 10 to the DFE 30 will be described.

The host device 10 generates original copy data in which special color plate information (image data for special color plate described below) is added to image data for color plate according to specification of the user. The special color plate is image data for causing special toners or inks such as white, gold, and silver to adhere, in addition to basic colors such as CMYK, and is data for printers in which such special toners or inks are mounted. As the special color plate, R may be added to the CMYK basic colors or Y may be added to RGB basic colors, in order to improve color reproducibility. Typically, the clear toner has been treated as one of the special colors. In the image forming system 1 of the present embodiment, a transparent developer that is a clear toner as a special color is used in addition to color developers that are toners of the CMYK basic colors. The image forming system 1 of the present embodiment executes a plurality of different types of transparent processing (may sometimes be referred to as clear processing) by using the clear toner. As the clear processing, there are processing of forming a gloss effect that is visual or tactile effect provided to a paper and processing of forming a transparent image, using the clear toner. As the clear processing, various known technologies can be used.

Figure 2:
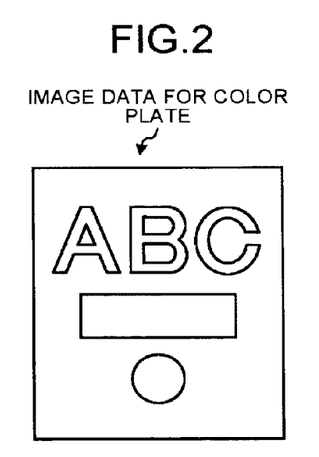
FIG. 2 is a diagram illustrating an example of image data for color plate.

The image data for color plate is image data that defines an image to be formed with a color developer of a color toner. Specifically, the image data for color plate is image data that defines color density values of the RGB, CMYK, or the like, for each drawing area. FIG. 2 is an explanatory diagram illustrating an example of the image data for color plate. In FIG. 2, the density value corresponding to a color specified by the user is provided for each drawing area (object) such as "A", "B", or "C". The density value of each drawing area is represented by a density value of 0 to 100%, for example (may be represented by "0" to "255", or the like).

The image data for special color plate is data that defines a transparent area to be realized using the clear toner. The image data for special color plate includes image data for gloss control plate and image data for clear plate. These image data for gloss control plate and the image data for clear plate are generated based on specification of the user. The image data for gloss control plate is image data that defines a gloss effect to be provided to a paper. Specifically, the image data for gloss control plate is image data that identifies an area to which the gloss effect is provided and a type of the gloss effect, in order to perform adhesion control of the clear toner according to the gloss effect that is visual or tactile effect to be provided to a paper. The image data for clear plate is image data that identifies a transparent image of a water mark, texture, or the like other than the above-described gloss effects. Note that, in the description below, a case of using only the image data for gloss control plate as the image data for special color plate will be described as an example.

In the image data for gloss control plate, the density value of a gloss area (drawing area) that indicates an area to which the clear toner is provided is represented by the density value of 0 to 100% (may be represented by "0" to "255", or the like), similarly to the image data for color plate of the RGB, CMYK, or the like, and the type of the gloss effect is associated with the density value.

Here, as the types of the gloss effects, there are roughly one related to presence or absence of gloss, surface protection, a watermark with embedded information, and texture. As for the gloss effect related to the presence or absence of gloss, there are roughly four types, as exemplarily illustrated in FIG. 3, including specular gloss (premium gloss (PG)), solid gloss (gloss (G)), halftone-dot matt (matt (M)), and matting (premium matt (PM)) in descending order of the degree of gloss (glossiness). Hereinafter, the specular gloss may be referred to as "PG", the solid gloss may be referred to as "G", the halftone-dot matt may be referred to as "M", and the matting may be referred to as "PM".

Figure 3:
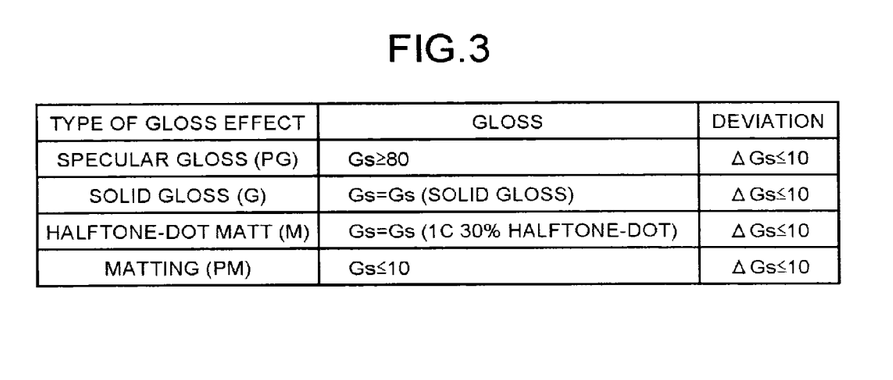
FIG. 3 is a diagram exemplarily illustrating types of gloss effects.

The specular gloss and the solid gloss have a high degree of providing gloss. In contrast, the halftone-dot matt and the matting suppress gloss, and especially, the matting realizes glossiness lower than that of a normal paper. In the drawing, the specular gloss indicates glossiness Gs of 80 or more, the solid gloss indicates solid glossiness made by a primary color or a secondary color, the halftone-dot matt indicates glossiness of a primary color and halftone-dot of 30%, and the matting indicates glossiness of 10 or less. Further, a deviation of the glossiness is represented by ΔGs, and is 10 or less.

For the respective types of the gloss effects, a high density value is associated with the gloss effect having a high degree of providing gloss, and a low density value is associated with the gloss effect that suppresses gloss. The gloss effect of the watermark, texture, or the like is associated with an intermediate density value. As the watermark, a character, a background pattern, or the like is used. The texture expresses a character or a pattern, and can provide a tactile effect, in addition to a visual effect. For example, a stained glass pattern can be realized by the clear toner. The specular gloss or the solid gloss is used as a substitute for the surface protection.

Note that to which object in the image data for color plate the gloss effect is provided, and which type of the gloss effect is provided to the object are determined according to specification of the user. The host device 10 sets the density value corresponding to the gloss effect specified by the user to each drawing area that serves as a target to which the gloss effect is provided, thereby to generate image data for gloss control plate in a vector format.

Figure 4:
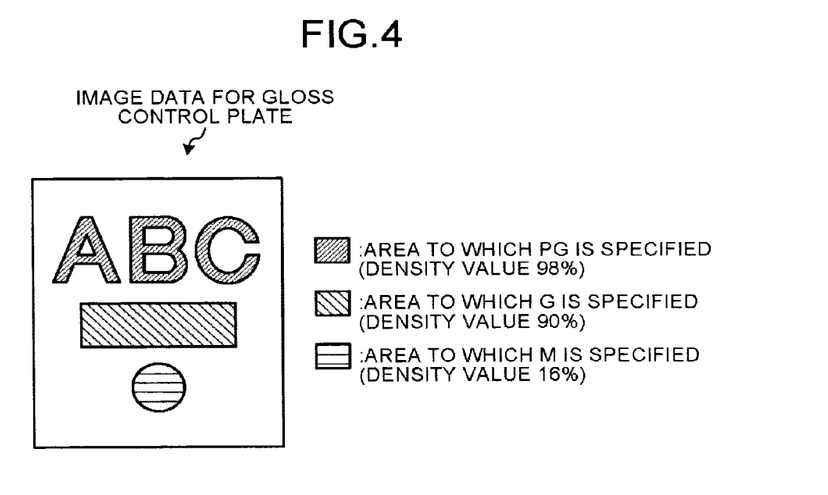
FIG. 4 is a diagram illustrating image data for gloss control plate as an image.

FIG. 4 is an explanatory diagram illustrating an example of the image data for gloss control plate. The example of the image data for gloss control plate of FIG. 4 illustrates that the gloss effect "PG (specular gloss)" is provided to a drawing areas "ABC", the gloss effect "G (solid gloss)" is provided to a drawing area "(rectangular figure)", and the gloss effect "M (halftone-dot matt) is provided to a drawing area "(circular figure)", according to specification of the user.

The image data for color plate and the image data for gloss control plate are generated in a portable document format (PDF) in page units, and these image data for color plate and the image data for gloss control plate are integrated to generate the original copy data. The generated original copy data is then transmitted to the DFE 30. Note that the data format of image data for each plate is not limited to the PDF, and an arbitrary format can be used.

In the host device 10 of the present embodiment, an application (may be referred to as "special color object creation application" in the description below) for determining to which object in the image data for color plate (corresponding to "target image data" in Claims, in this example) the gloss effect is provided, and what type of the gloss effect is provided to the object, according to specification of the user, is mounted. Hereinafter, functions that the host device 10 has will be described, mainly focusing on the function related to the special color object creation application. Note that, in this example, the host device 10 can be considered to correspond to an "information processing device" in Claims.

Figure 5:
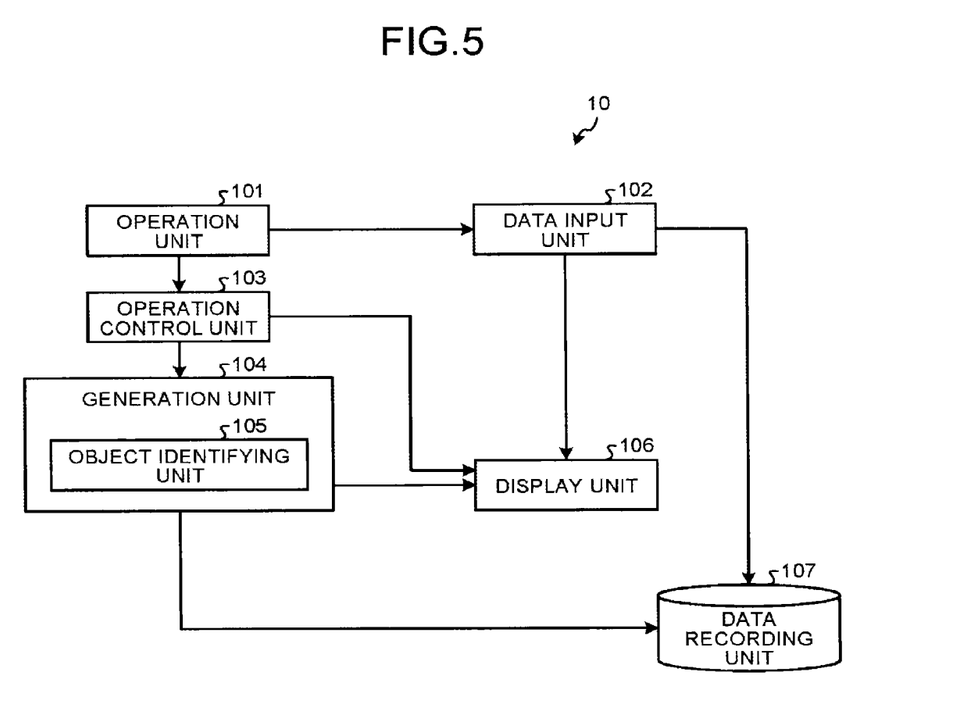
FIG. 5 is a diagram illustrating an example of a functional configuration of a host device.

FIG. 5 is a block diagram illustrating an example of a functional configuration of the host device 10. As illustrated in FIG. 5, the host device 10 includes an operation unit 101, a data input unit 102, an operation control unit 103, a generation unit 104, a display unit 106, and a data recording unit 107.

The operation unit 101 is an input device used by the user for inputting various instructions and various types of setting, and can be configured from a keyboard, a mouse, or the like, for example. Hereinafter, a case in which the operation unit 101 is configured from a mouse will be described as an example.

Figure 6:
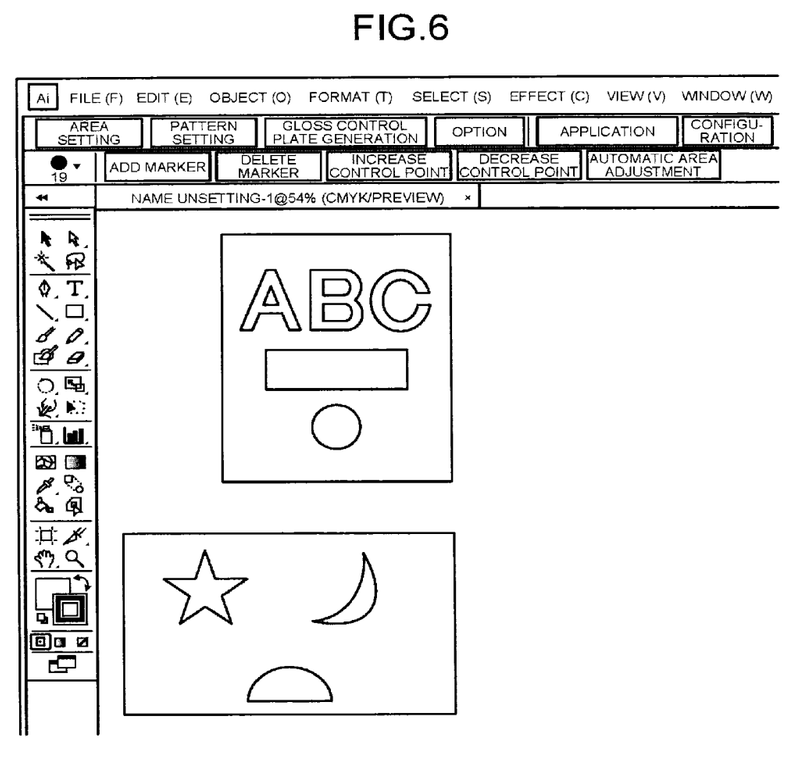
FIG. 6 is a diagram illustrating an example of a screen displayed by an image processing application.

The data input unit 102 reads electronic data (or example, image data for color plate stored in a memory (not illustrated)) specified according to an operation of the operation unit 101 from a memory (not illustrated), and records the read electronic data in the data recording unit 107. Further, the data input unit 102 performs control of converting the read electronic data into preview display data in a data format that can be treated in the display unit 106, and displaying the converted data in the display unit 106. In this example, the data input unit 102 displays a screen exemplarily illustrated in FIG. 6 in the display unit 106. FIG. 6 illustrates an example of a screen displayed when a plug-in is incorporated in Illustrator sold by Adobe Systems® Incorporated. The screen illustrated in FIG. 6 displays an image (may be referred to as "target image" in the description below) represented by the image data for color plate specified by the user through the operation unit 101.

Figure 7:
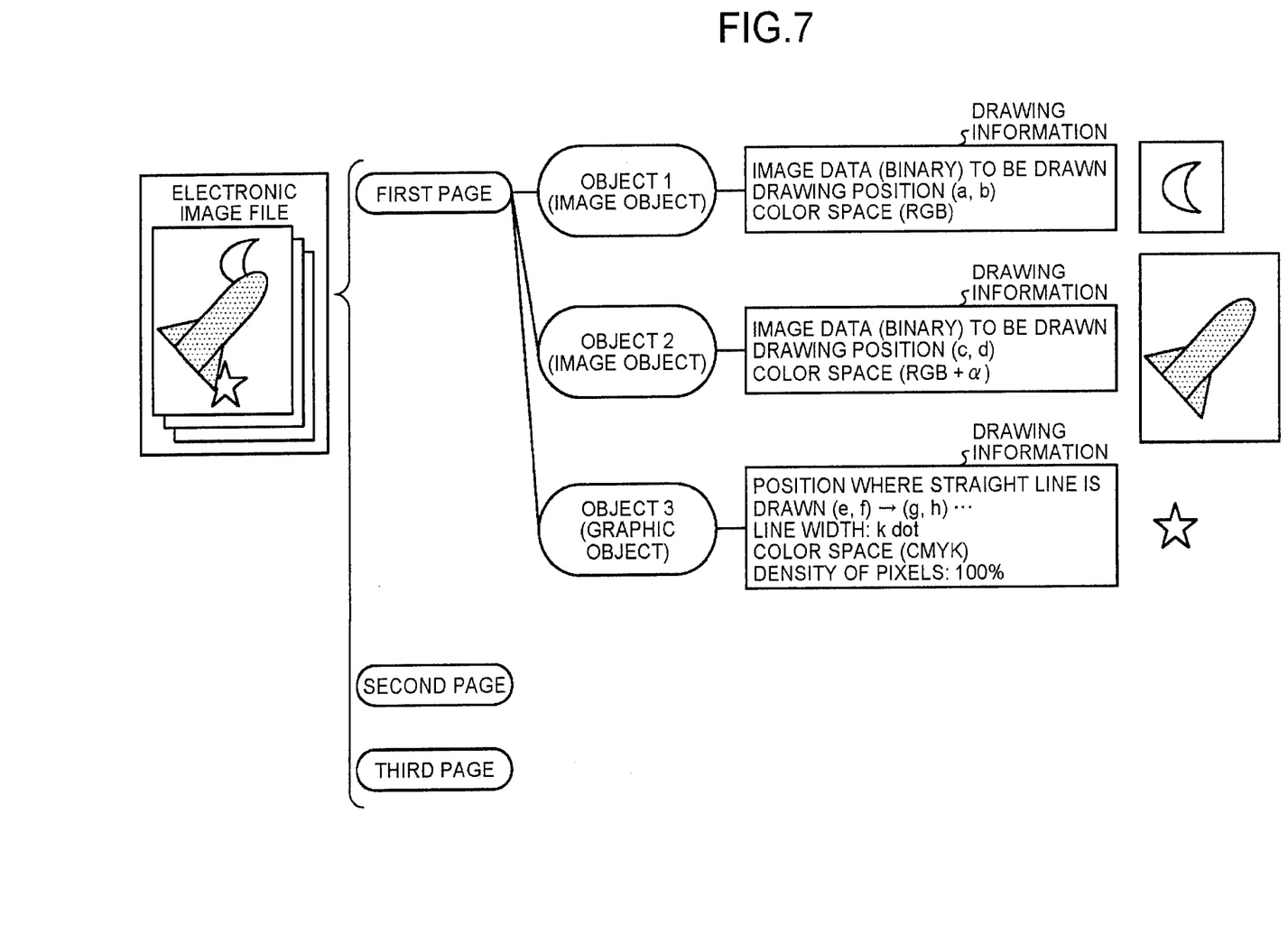
FIG. 7 is a diagram illustrating an example of a configuration of image data for color plate.

FIG. 7 is a diagram illustrating an example of a configuration of the image data for color plate stored in the data recording unit 107 as electronic data (an electronic image file). The image data for color plate includes drawing information of each object included in the same page. For example, the drawing information includes information indicating a position of a drawing area, a color space, and density. In the example of FIG. 7, an object 1 is an image object that indicates an object expressed by pixel data, and includes information indicating a drawing position and an RGB color space as the drawing information. An object 2 is also an image object, and includes information indicating a drawing position and an RGB color space as the drawing information. Further, an object 3 is a graphic object that indicates an object expressed by vector data, and includes information indicating a position where a straight line is drawn, a line width, a CMYK color space, and density of each pixel as the drawing information.

Referring back to FIG. 5, and description will be continued. The operation control unit 103 converts an operation received from the operation unit 101 into available event information, and notifies the generation unit 104 of the event information. In this example, the user operates the mouse while confirming a target image displayed in the display unit 106, moves a mouse cursor that indicates a current location of a mouse input to an arbitrary position on the target image, and performs a click operation, thereby to specify the arbitrary position. The event information of this case may just be information including at least specified position information that indicates the position specified by the user with respect to the target image. Further, here, the position of the mouse cursor in a state where the user does not perform the click operation (in a state where the user does not perform an operation of specifying the arbitrary position on the target image) can be considered to indicate a position currently pointed at by the user, of the target image, (which is distinguished from a "position specified by the user").

Further, the operation control unit 103 can perform control of displaying various images in the display unit 106 according to a user operation received from the operation unit 101. For example, in FIG. 6, when the user presses a button image (not illustrated) for selecting the special color object creation application through the operation unit 101, the operation control unit 103 performs control of displaying a UI image related to the object creation application in the display unit 106. When the button image for selecting the special color object creation application is pressed, the special color object creation application is executed (started), and the user performs an operation input through the operation unit 101, thereby to specify to which object in the image data for color plate the gloss effect is provided, and what type of the gloss effect is provided to the object. Then, as described below, the host device 10 generates a special color object according to the specification of the user.

Note that, in this example, when having received the click operation of the mouse by the user in a state where the special color object creation application is started, the operation control unit 103 notifies the generation unit 104 of a special color object generation instruction that instructs creation of the special color object, and the event information including at least the specified position information.

Referring back to FIG. 5, and description will be continued. The generation unit 104 includes an object identifying unit 105. Further, the generation unit 104 has a function to receive the event information from the operation control unit 103 (that is, a function to receive the specified position information). In the example, the generation unit 104 can be considered to have a function corresponding to a "receiving unit" in Claims.

When having received the special color object generation instruction and the event information from the operation control unit 103, the generation unit 104 requests the object identifying unit 105 to identify an object (that may be referred to as "first object" in the description below) including a position indicated by the specified position information included in the received event information. The object identifying unit 105 that has received the request acquires an electronic image file (the image data for color plate exemplarily illustrated in FIG. 7, in this example) of the target image from the data recording unit 107, and identifies the first object based on drawing information of each object included in the acquired electronic image file, and the specified position information. In this example, the object identifying unit 105 can be considered to have a function corresponding to a "first identifying unit" in Claims.

Next, the generation unit 104 generates an object (which may be referred to as "third object" in the description below) having the same shape with the object (first object) identified by the object identifying unit 105. For example, the generation unit 104 generates a graphic object having appearance information that indicates an appearance (contour) of the first object, as the third object. Note that, as a method of acquiring the appearance information, various known technologies can be used. Further, the generation unit 104 arranges the generated third object right above the first object. For example, when a part of an object (which may be referred to as "second object" in the description below) having higher priority of display than the first object overlaps with the first object, the priority of display of the third object is set to be higher than the priority of display of the first object, and is set to be lower than the priority of display of the second object.

Next, the generation unit 104 sets a color space and a density value of the third object according to the type of the gloss effect specified by the user. As described above, the generation unit 104 generates the image data for gloss control plate. The host device 10 then integrates the image data for color plate that is the target image data and the image data for gloss control plate to generate original copy data.

Figure 8:
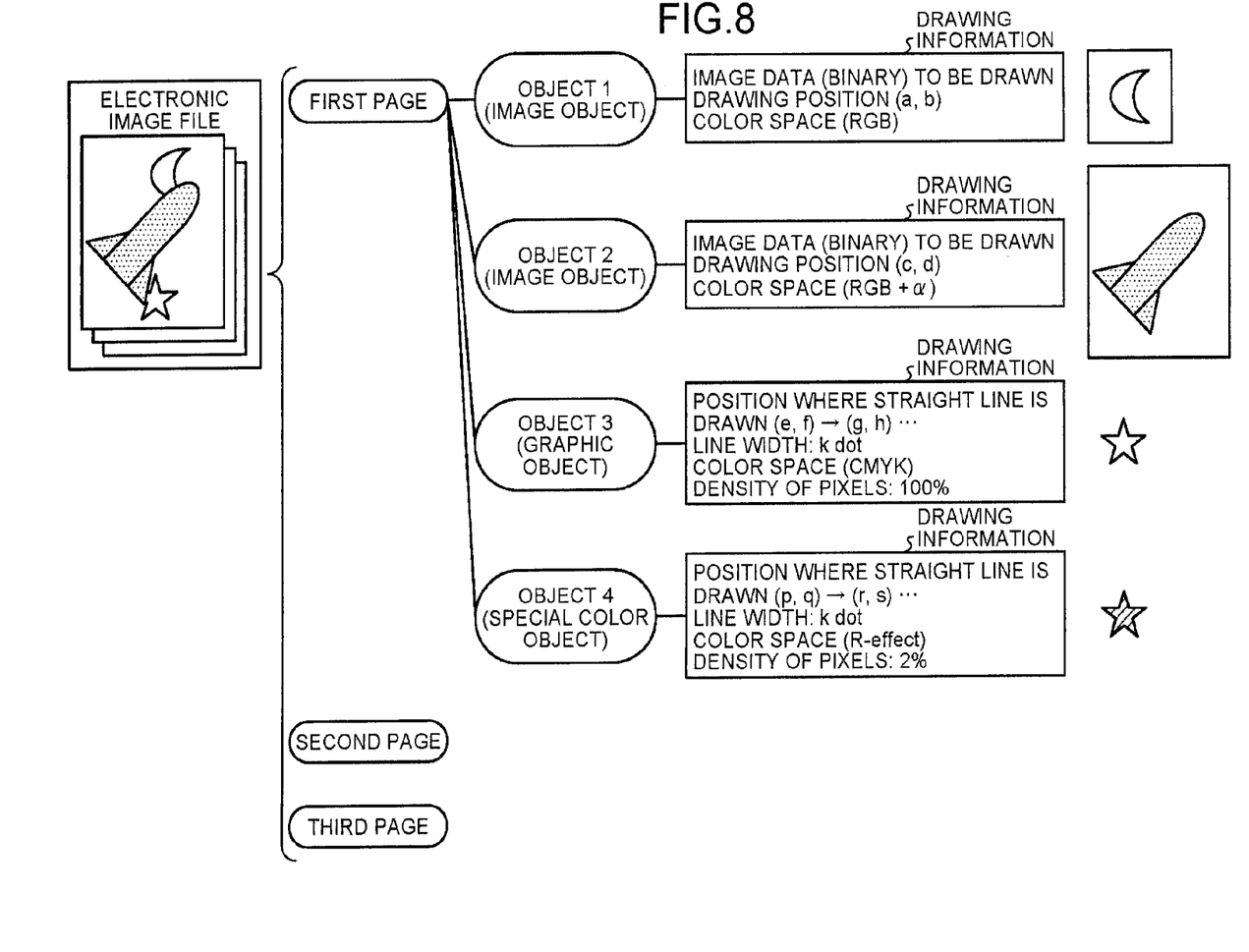
FIG. 8 is a diagram illustrating an example of a configuration of original copy data.

For example, assume a case in which the object 3 illustrated in FIG. 7 is the first object. In this example, assume that a part of the object 3 overlaps with the object 2 having higher priority of display than the object 3. In this case, the generation unit 104 generates the third object that is an object having the same shape as the object 3, and having lower priority of display than the object 2 and having higher priority of display than the object 3. The generation unit 104 then sets the color space and the density of the third object according to the type of the gloss effect specified by the user, thereby to change the third object to a special color object. Here, the special color object is referred to as "object 4". FIG. 8 is a diagram illustrating an example of a configuration of the original copy data of this case. The original copy data includes the drawing information of each object included in the same page.

Each object is identified with the image data for color plate and the image data for gloss control plate. The objects 1 to 3 are similar to the content exemplarily illustrated in FIG. 7. The newly added object 4 indicates an object (special color object) obtained such that the color space of the above-described third object is set to a color space of an R-effect that indicates a gloss area to which the gloss effect is provided, and the density value of the third object is set to a density value corresponding to the type of the gloss effect specified by the user. The drawing information of the object 4 includes information that indicates a position where a straight line is drawn, a line width, the color space of an R-effect, and the density of each pixel. Note that, while the R-effect is defined as a color plate in the object 4, this is a color plate that cannot be expressed in the CMYK at the time of printing. Typically, when printing is performed using a toner (for example, a red toner) other than the CMYK, red is defined as a color plate in the electronic image file. Similarly, in the clear toner, special definition is used in the color space of an output of a portion where the clear toner is used, in the electronic image file, instead of the CMYK.

Figure 9:
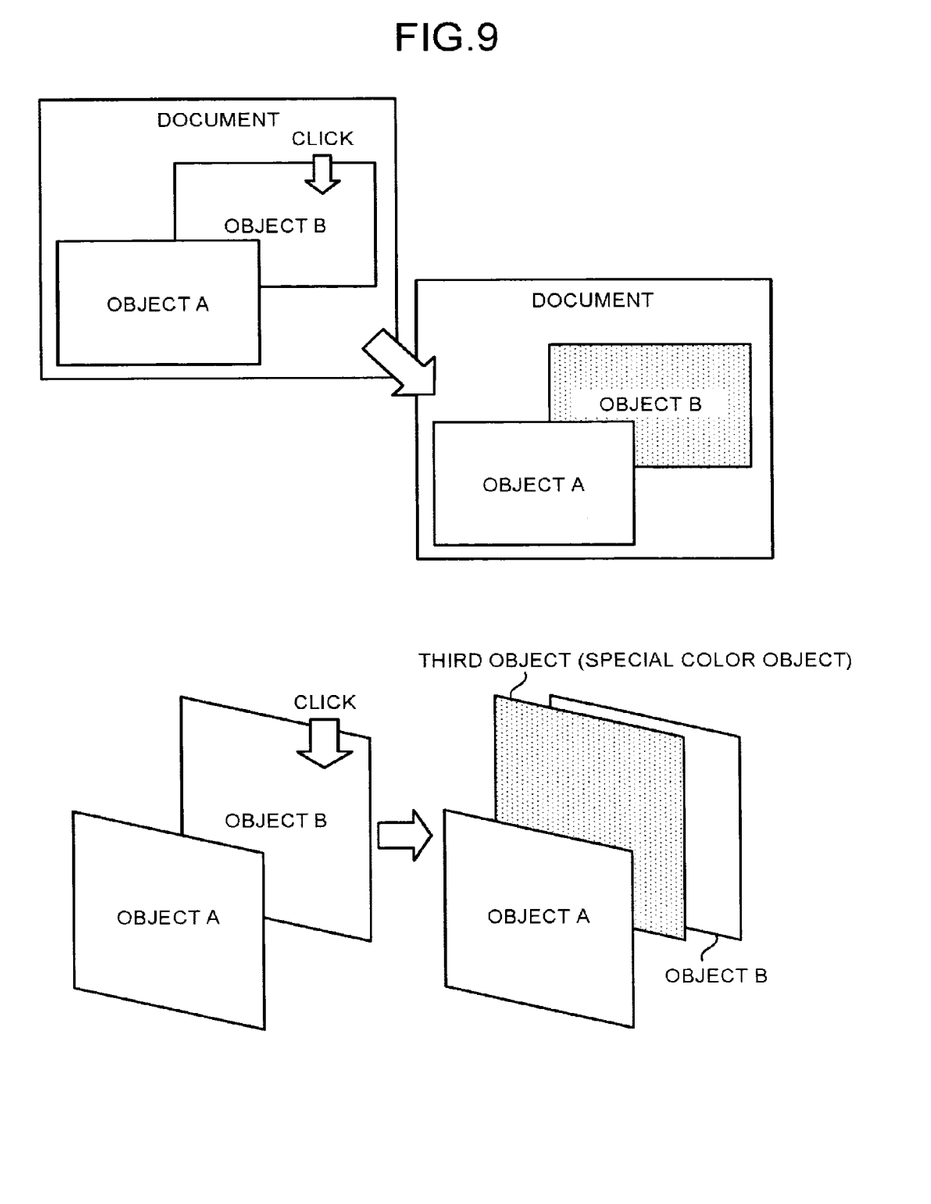
FIG. 9 is a conceptual diagram illustrating a method of generating the special color object.

FIG. 9 is a conceptual diagram illustrating a method of generating the special color object in the present embodiment. As illustrated in FIG. 9, when the user clicks a position included in an object B with the mouse, in a case where a part of the object B overlaps with an object A having higher priority of display than the object B, the third object that indicates a graphic object having the same shape as the object B is arranged right above the object B. Then, the color space and the density of the third object are set according to the type of a surface effect specified by the user. Accordingly, the special color object is arranged right above the object B. As described above, the priority of display of the third object (special color object) is set to be higher than that of the object B, and is set to be lower than that of the object A, and thus the object A having higher priority of display is not hidden by the generated special color object.

Referring back to FIG. 5, and description will be continued. The display unit 106 is a device that displays various images, and may be configured from a liquid crystal display, or the like.

The data recording unit 107 is a device that records various types of data, and may be configured from a hard disk drive device (HDD) or a storage medium such as a flash memory. In this example, the data recording unit 107 holds information that indicates the priority of display of each object, layer information in which each layer that indicates a virtual sheet on which one or more images are drawn is associated with protection information that indicates whether editing of the layer is prohibited, and the like.

Here, the operation control unit 103 of the present embodiment has a function to identify a fourth object that indicates an object including a position of the mouse cursor in a state where the user does not perform the click operation (a position currently pointed at by the user, of the image indicated by the target image data). Further, the operation control unit 103 refers to the layer information, and when the editing of a layer to which the fourth object belongs is prohibited, the operation control unit 103 performs control of notifying of the fact that the editing is prohibited. Note that, in this example, the operation control unit 103 can be considered to have a function corresponding to a "second identifying unit" and a function corresponding to a "notification control unit" in Claims. However, the configuration is not limited to the example, and a configuration in which the function corresponding to the "second identifying unit" and the function corresponding to the "notification control unit" in Claims are separately provided may be employed.

Figure 10:
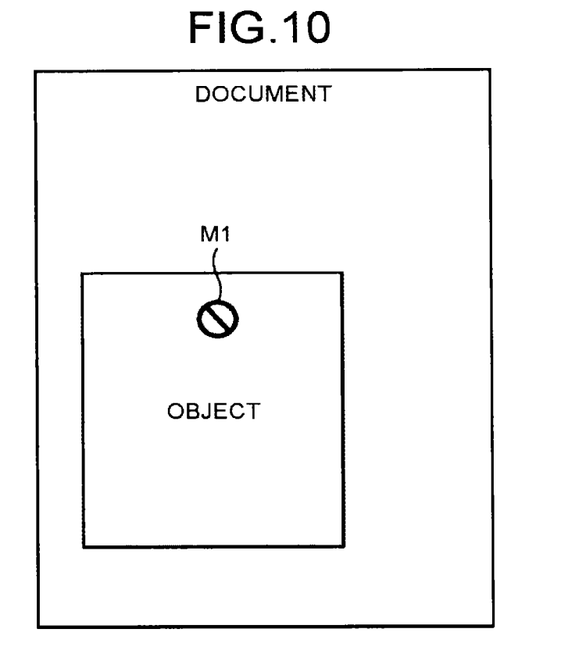
FIG. 10 is a diagram for describing control of changing display of the mouse cursor.

When the editing of a layer to which the fourth object belongs is prohibited, it is not possible to generate the special color object and to arrange the object on the layer. Therefore, the operation control unit 103 performs control of changing the display of the mouse cursor (changing the color or the shape, for example). Specifically, as illustrated in FIG. 10, the operation control unit 103 performs control of displaying a mouse cursor M1 that indicates prohibition of processing.

Figure 11:
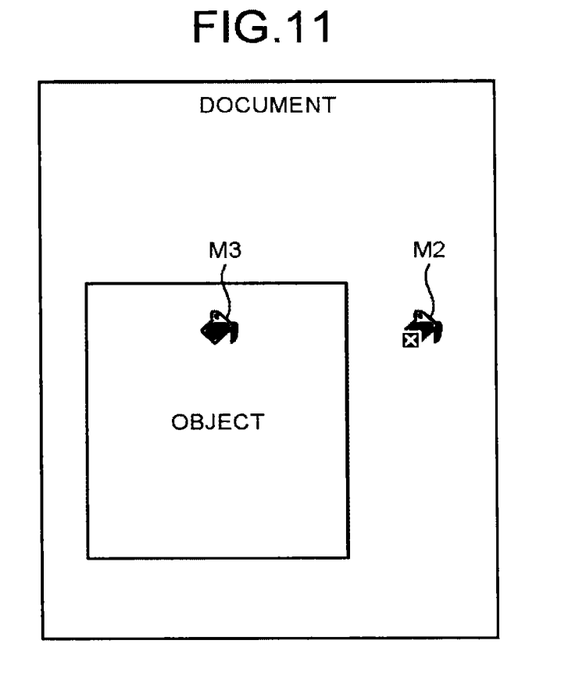
FIG. 11 is a diagram for describing control of changing display of the mouse cursor.

Further, when the above-described fourth object does not exist, the operation control unit 103 performs control of notifying of the fact that the fourth object does not exist. Specifically, as illustrated in FIG. 11, the operation control unit 103 performs control of displaying a mouse cursor M2 that indicates an object to be processed does not exist in the current location of the mouse input. Meanwhile, when the fourth object exists, the operation control unit 103 performs control of displaying a mouse cursor M3 that indicates the object to be processed exists in the current location of the mouse input.

Figure 12:
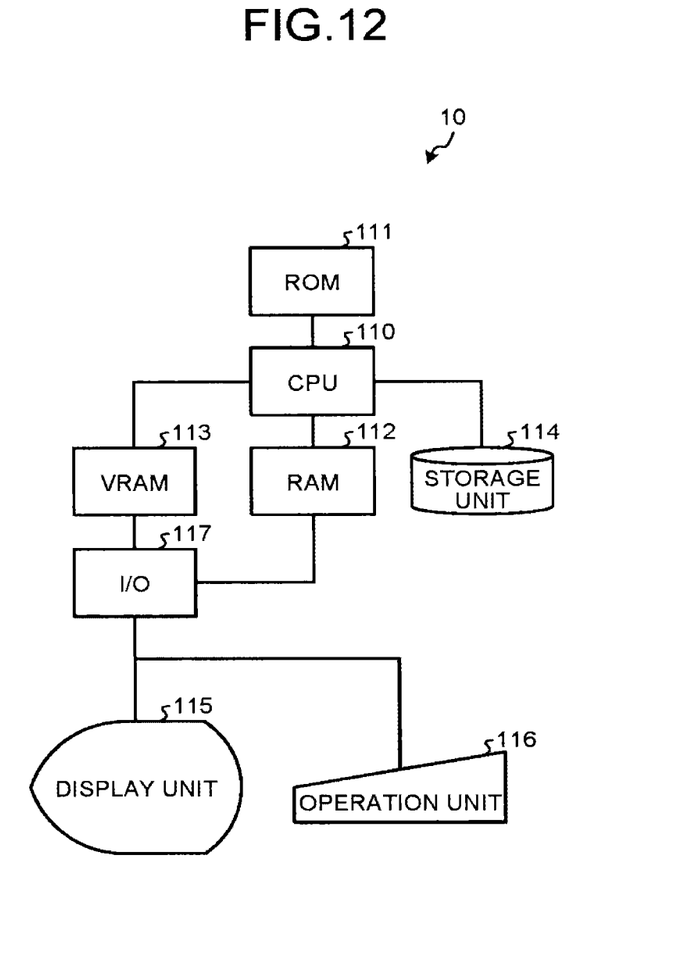
FIG. 12 is a diagram illustrating an example of a hardware configuration of the host device.

FIG. 12 is a diagram illustrating an example of a hardware configuration of the host device 10. As illustrated in FIG. 12, the host device 10 includes a central processing unit (CPU) 110, memories such as a ROM 111, a RAM 112, and a VRAM 113, a storage unit 114 such as an HDD, a display unit 115 such as a display, an operation unit 116 such as a keyboard or a mouse, and an input/output interface I/O 117, and has a hardware configuration using a normal computer.

In the present embodiment, the CPU 110 reads a program stored in the ROM 111, or the like to the RAM 112, and executes the program, thereby to realize respective functions of the data input unit 102, the operation control unit 103, and the generation unit 104 (the object identifying unit 105). However, the configuration is not limited to the example, and at least a part of the data input unit 102, the operation control unit 103, and the generation unit 104 may be realized by a dedicated hardware circuit (for example, a semiconductor integrated circuit, or the like). Further, in this example, the operation unit 101 is realized by the operation unit 116, and the display unit 106 is realized by the display unit 115. Further, the data recording unit 107 can be realized by the storage unit 114, or the like.

Note that the program executed by the CPU 110 may be provided by being recorded in a computer-readable recording medium such as a CD-ROM, a flexible disk (FD), a CD-R, or a digital versatile disk (DVD) with a file in an installable format or an executable format. Further, the program executed by the CPU 110 may be stored on a computer connected to a network such as the Internet, and may be provided by being downloaded through the network. Further, the control program executed by the CPU 110 may be distributed or provided through the network such as the Internet.

Figure 13:
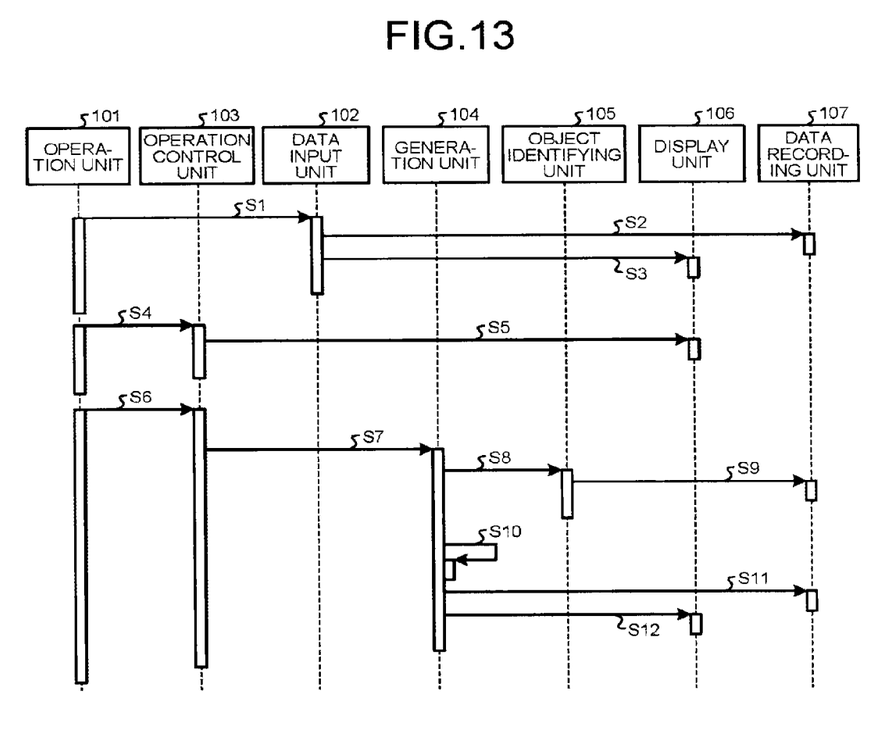
FIG. 13 is a diagram illustrating an example of a procedure of generating a special color object by the host device.

FIG. 13 is a diagram illustrating an example of a procedure of generating the special color object by the host device 10. First, when having received an operation of specifying the image data for color plate stored in a memory (not illustrated) through the operation unit 101 (step S1), the data input unit 102 reads the specified image data for color plate from the memory (not illustrated), and records the electronic image file that indicates the read image data for color plate, in the data recording unit 107 (step S2). Further, the data input unit 102 converts the read image data for color plate into preview display data in a data format that can be treated in the display unit 106, and performs control of displaying the converted data in the display unit 106 (step S3).

Next, when having received an operation of pressing the button image (not illustrated) for selecting the special color object creation application through the operation unit 101 (step S4), the operation control unit 103 performs control of displaying the UI image related to the special color object creation application in the display unit 106 (step S5). At this time, the special color object creation application is started (executed).

Next, when having received the click operation of the mouse through the operation unit 101 (step S6), the operation control unit 103 notifies the generation unit 104 of the special color object generation instruction together with the event information including the specified position information (information indicating the position clicked with the mouse) (step S7). The generation unit 104 that has received the special color object generation instruction and the event information requests the object identifying unit 105 to identify the first object including the position indicated by the specified position information included in the received event information (step S8). The object identifying unit 105 that has received the request acquires the electronic image file that indicates the image data for color plate specified by the user from the data recording unit 107 (step S9), and identifies the first objet based on the drawing information of each object included in the acquired electronic image file and the specified position information included in the received event information.

Next, the generation unit 104 generates a graphic object having the appearance information that indicates the appearance (contour) of the first object identified by the object identifying unit 105, as the third object. Next, the generation unit 104 sets the color space and the density value of the third object according to the type of the gloss effect specified by the user, thereby to change the third object to the special color object (step S10). Then, the generation unit 104 records the generated special color object in the data recording unit 107 (step S11), and then performs control of displaying the special color object in the display unit 106 (step S12).

Figure 14:
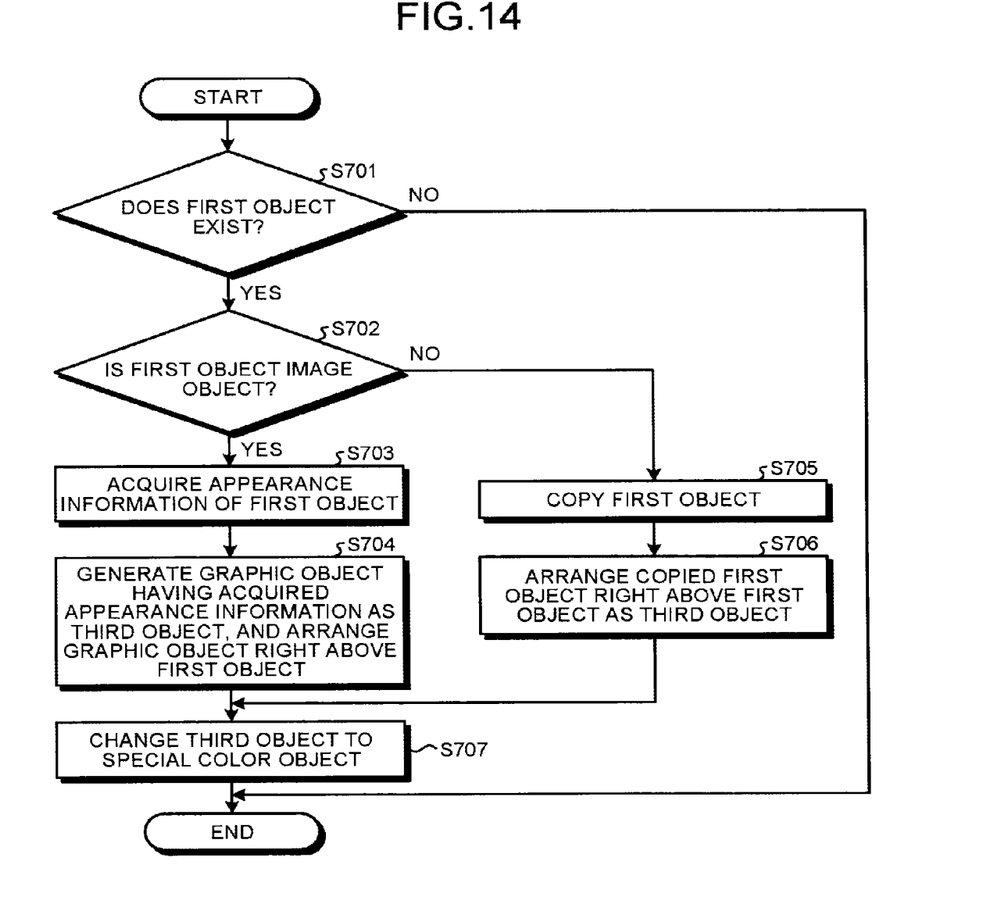
FIG. 14 is a flowchart illustrating an example of processing by a generation unit.

FIG. 14 is a flowchart illustrating an example of processing by the generation unit 104 when the special color object generation instruction and the event information are received. As described above, the generation unit 104 that has received the special color object generation instruction and the event information requests the object identifying unit 105 to identify the first object including the position indicated by the specified position information included in the received event information. The object identifying unit 105 that has received the request refers to the electronic image file indicating the image data for color plate that is the target image data, and determines whether the first object including the position indicated by the specified position information exists, based on the drawing information of each object and the specified position information included in the received event information (step S701). When the first object does not exist (No in step S701), the processing is terminated.

When the first object exists (Yes in step S701), the object identifying unit 105 refers to the drawing information of the first object, and determines whether the first object is an image object (step S702). When the first object is an image object (Yes in step S702), the generation unit 104 acquires the appearance information of the first object (step S703). Next, the generation unit 104 generates a graphic object having the acquired appearance information, as the third object, and arranges the generated third object right above the first object (step S704). In short, the generation unit 104 causes an attribute of the third object to be the graphic object when an attribute of the first object is the image object that indicates an object expressed by pixel data.

Meanwhile, in step S702, when the first object is a graphic object (No in step S702), the generation unit 104 copies the first object (step S705), and arranges the copied first object right above the first object, as the third object (step S706). To be short, the generation unit 104 causes the attribute of the third object to be the same as the attribute of the first object when the attribute of the first object is a graphic object that indicates an object expressed by a text or vector data.

After step S704 or S706, the generation unit 104 sets the color space and the density of the third object according to the type of the gloss effect specified by the user, thereby to change the third object to the special color object (step S707).

Next, an example of processing by the operation control unit 103 in a state where the user performs an operation of moving the mouse cursor without performing the click operation (without performing the operation of specifying an arbitrary position on the target image) will be described with reference to FIG. 15. In this example, the operation control unit 103 has a function to acquire input position information that indicates the position of the mouse cursor in a state where the user does not perform the click operation.

Figure 15:
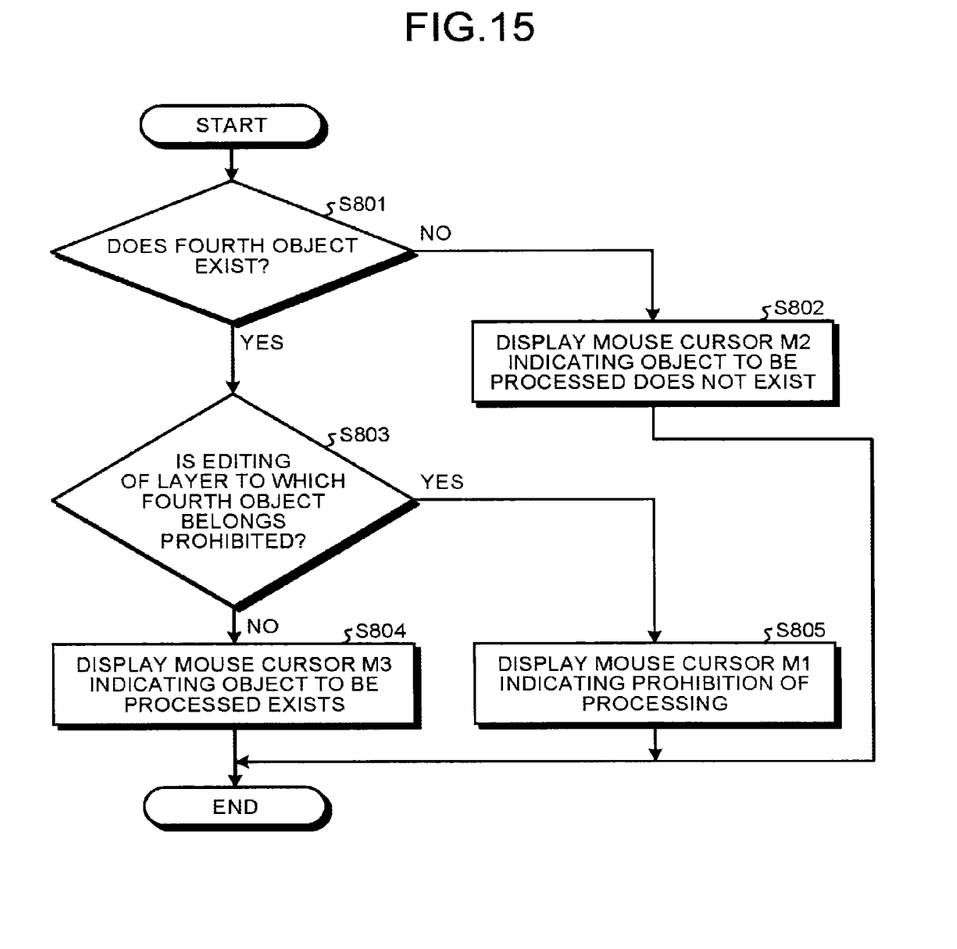
FIG. 15 is a flowchart illustrating an example of processing by an operation control unit.

As illustrated in FIG. 15, the operation control unit 103 refers to the electronic image file indicating the image data for color plate that is the target image data, and determines whether the fourth object including the position indicated by the input position information exists, based on the drawing information of each object and the input position information indicating the position of the mouse cursor in a state where the user does not perform the click operation (step S801). When the fourth object does not exist (No in step S801), the operation control unit 103 performs control of displaying the mouse cursor M2 (see FIG. 11) that indicates the object to be processed does not exist in the current location of the mouse input (step S802)

Meanwhile, when the fourth object exists (Yes in step S801), the operation control unit 103 determines whether the editing of the layer to which the fourth object belongs is prohibited (step S803). When the editing of the layer to which the fourth object belongs is not prohibited (No in step S803), the operation control unit 103 performs control of displaying the mouse cursor M3 (see FIG. 11) that indicates the object to be processed exists in the current location of the mouse input (step S804). When the editing the layer to which the fourth object belongs is prohibited (Yes in step S803), the operation control unit 103 performs control of displaying the mouse cursor M1 (see FIG. 10) that indicates prohibition of processing (step S805).

As described above, in the present embodiment, the third object having the same shape as the first object including the click position of the mouse, of the object included in the image data for color plate that is the target image data, is generated, and is arranged right above the first object. For example, in a case where a part of the first object overlaps with the second object having higher priority of display than the first object, the priority of display of the third object is set to be higher than that of the first object, and is set to be lower than that of the second object. Then, the color space and the density of the third object is set according to the type of the gloss effect specified by the user, whereby the third object is changed to the special color object. Here, the second object is not hidden by the added special color object, and thus the special color object can be added only to a portion of the first object, the portion not overlapping with the second object. That is, according to the present embodiment, the user performs only the click operation, thereby to add the special color object only to the portion of the first object, the portion not overlapping with the second object.

Note that, in the above embodiments, the configuration to generate the original copy data in which the information of the special color plate (image data for special color plate) is added to the image data for color plate has been described as an example. However, a configuration to which the present invention can be applied is not limited to the configuration, and for example, may be a configuration in which the image data for special color plate is not generated.

According to the present invention, it is possible to improve work efficiency of a user when another object is added only to a portion of the first object, the portion not overlapping with the second object having higher priority of display than the first object.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a receiving unit configured to receive specified position information indicating a position specified by a user with respect to an image indicated by target image data including drawing information of each object;
a first identifying unit configured to identify a first object indicating an object including the position indicated by the specified position information; and
a generation unit configured to generate a third object indicating an object having lower priority of display than a second object indicating an object having higher priority of display than the first object, and having higher priority of display than the first object, and an object having a same shape as the first object.

2. The information processing device according to claim 1, wherein, when an attribute of the first object is a graphic object indicating an object expressed by a text or vector data, the generation unit causes an attribute of the third object to be same as the attribute of the first object.

3. The information processing device according to claim 2, wherein, when the attribute of the first object is an image object indicating an object expressed by pixel data, the generation unit causes the attribute of the third object to be the graphic object.

4. The information processing device according to claim 1, further comprising:
a second identifying unit configured to identify a fourth object indicating an object including a position currently pointed at by the user, of the image indicated by target image data; and
a notification control unit configured to refer to layer information in which each layer indicating a virtual sheet on which one or more images are drawn is associated with protection information indicating whether editing of the layer is prohibited, and when editing of a layer to which the fourth object belongs is prohibited, to perform control of notifying of the prohibition of the editing of the layer.

5. The information processing device according to claim 4, wherein, when the fourth object does not exist, the notification control unit performs control of notifying the fourth object does not exist.

6. The information processing device according to claim 1, wherein the generation unit sets a color space and density of the third object according to a type of a gloss effect specified by the user.

7. A method of processing information comprising:
- a receiving step of receiving specified position information indicating a position specified by a user with respect to an image indicated by target image data including drawing information of each object;
- a first identifying step of identifying a first object indicating an object including the position indicated by the specified position information; and
- a generation step of generating a third object indicating an object having lower priority of display than a second object indicating an object having higher priority of display than the first object, and having higher priority of display than the first object, and an object having a same shape as the first object.

8. A computer-readable recording medium that stores therein a computer program causing a computer to execute a method of processing information, the method comprising:
- a receiving step of receiving specified position information indicating a position specified by a user with respect to an image indicated by target image data including drawing information of each object;
- a first identifying step of identifying a first object indicating an object including the position indicated by the specified position information; and
- a generation step of generating a third object indicating an object having lower priority of display than a second object indicating an object having higher priority of display than the first object, and having higher priority of display than the first object, and an object having a same shape as the first object.

* * * * *